US012809643B2

(12) United States Patent
Selvaraj

(10) Patent No.: US 12,809,643 B2
(45) Date of Patent: Nov. 24, 2026

(54) SCALABLE AND DYNAMIC PROCESS FOR REHYDRATING UNIVERSAL CONTAINER BASE IMAGES

(71) Applicant: Capital One Services, LLC, McLean, VA (US)

(72) Inventor: Sugavaneswaran Selvaraj, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 491 days.

(21) Appl. No.: 18/492,233

(22) Filed: Oct. 23, 2023

(65) Prior Publication Data

US 2025/0130818 A1 Apr. 24, 2025

(51) Int. Cl.

*G06F 9/44* (2018.01)
*G06F 8/61* (2018.01)
*G06F 9/445* (2018.01)

(52) U.S. Cl.

CPC ............ *G06F 9/44521* (2013.01); *G06F 8/63* (2013.01)

(58) Field of Classification Search

CPC ......... G06F 9/44521; G06F 8/63; G06F 8/656
See application file for complete search history.

(56) References Cited

U.S. PATENT DOCUMENTS

| | | | | |
|---|---|---|---|---|
| 2019/0114164 A1* | 4/2019 | Wong | G06F 8/658 | |
| 2023/0091915 A1* | 3/2023 | Chen | G06F 8/658 | 717/168 |
| 2023/0418595 A1* | 12/2023 | BenHanokh | G06F 8/71 | |
| 2024/0168744 A1* | 5/2024 | Mohan | G06F 8/71 | |
| 2024/0202062 A1* | 6/2024 | Coady | G06F 9/45558 | |

* cited by examiner

*Primary Examiner* — Dong U Kim
(74) *Attorney, Agent, or Firm* — Harrity & Harrity, LLP

(57) ABSTRACT

In some implementations, a container processing device may receive a universal container base image, the universal container base image including a first set of instructions associated with an operating system associated with multiple applications. The container processing device may create a container based on the first set of instructions included in the universal container base image. The container processing device may receive an application-specific code separate from the universal container base image, the application-specific code including a second set of instructions associated with an application, of the multiple applications. The container processing device may inject the second set of instructions into the container during a runtime of the container. The container processing device may execute the application based on at least the first set of instructions included in the container and the second set of instructions included in the container.

20 Claims, 10 Drawing Sheets

SCALABLE AND DYNAMIC PROCESS FOR REHYDRATING UNIVERSAL CONTAINER BASE IMAGES

BACKGROUND

A container-based processing environment enables a customer of a serverless computing environment (sometimes referred to as a serverless container service, a serverless environment, and/or a serverless architecture) to provide an application-specific image to be executed by the serverless computing environment or a similar environment securely and in a cost-effective manner. Such environments provide a way to run applications securely isolated in a container, such as by running an application container in the serverless computing environment. A container may consist of an application, user-added files, and/or metadata for an application. Each container may be built from an image, which may specify what the container holds, what process to run when the container is launched, and a variety of other configuration data. The image may be a read-only template from which the container is launched. The image may consist of a series of layers and may be built from one or more base images. A container-based processing environment may execute an application by creating a container based on an image and begin servicing customer requests, accordingly.

SUMMARY

Some implementations described herein relate to a system for rehydrating a universal container base image in a container-based processing environment. The system may include one or more memories and one or more processors communicatively coupled to the one or more memories. The one or more processors may be configured to receive a universal container base image, the universal container base image including a first set of instructions associated with an operating system associated with multiple applications. The one or more processors may be configured to receive an application-specific code separate from the universal container base image, the application-specific code including a second set of instructions associated with an application, of the multiple applications. The one or more processors may be configured to execute the application based on at least the first set of instructions included in the universal container base image and the second set of instructions included in the application-specific code. The one or more processors may be configured to receive an updated universal container base image, the updated universal container base image including a third set of instructions associated with an updated operating system associated with the multiple applications. The one or more processors may be configured to execute the application based on at least the second set of instructions included in the application-specific code and the third set of instructions included in the updated universal container base image.

Some implementations described herein relate to a method for executing an application binary file. The method may include receiving, by a container processing device, a universal container base image, the universal container base image including a first set of instructions associated with an operating system associated with multiple applications. The method may include creating, by the container processing device, a container based on the first set of instructions included in the universal container base image. The method may include receiving, by the container processing device, an application-specific code separate from the universal container base image, the application-specific code including a second set of instructions associated with an application, of the multiple applications. The method may include injecting, by the container processing device, the second set of instructions into the container during a runtime of the container. The method may include executing, by the container processing device, the application based on at least the first set of instructions included in the container and the second set of instructions included in the container.

Some implementations described herein relate to a non-transitory computer-readable medium that stores a set of instructions. The set of instructions, when executed by one or more processors of a container processing device, may cause the container processing device to receive a universal container base image, the universal container base image including a first set of instructions associated with an operating system associated with multiple applications. The set of instructions, when executed by one or more processors of the container processing device, may cause the container processing device to create a container based on the first set of instructions included in the universal container base image. The set of instructions, when executed by one or more processors of the container processing device, may cause the container processing device to receive an application-specific code separate from the universal container base image, the application-specific code including a second set of instructions associated with an application, of the multiple applications. The set of instructions, when executed by one or more processors of the container processing device, may cause the container processing device to inject the second set of instructions into the container during a runtime of the container. The set of instructions, when executed by one or more processors of the container processing device, may cause the container processing device to execute the application based on at least the first set of instructions included in the container and the second set of instructions included in the container.

Some implementations described herein relate to creating an updatable universal container base image. The method may include creating, by a container image management device, a universal container base image, wherein the universal container base image includes a first set of instructions associated with an operating system associated with multiple applications. The method may include depositing, by the container image management device, the universal container base image in a container image repository. The method may include creating, by the container image management device, an application binary file separate from the universal container base image, wherein the application binary file includes a second set of instructions associated with an application, of the multiple applications, and wherein the application binary file is configured to be injected into a container associated with the universal container base image during a runtime of the container. The method may include depositing, by the container image management device, the application binary file in a binary file repository.

DETAILED DESCRIPTION

Figure 1A:
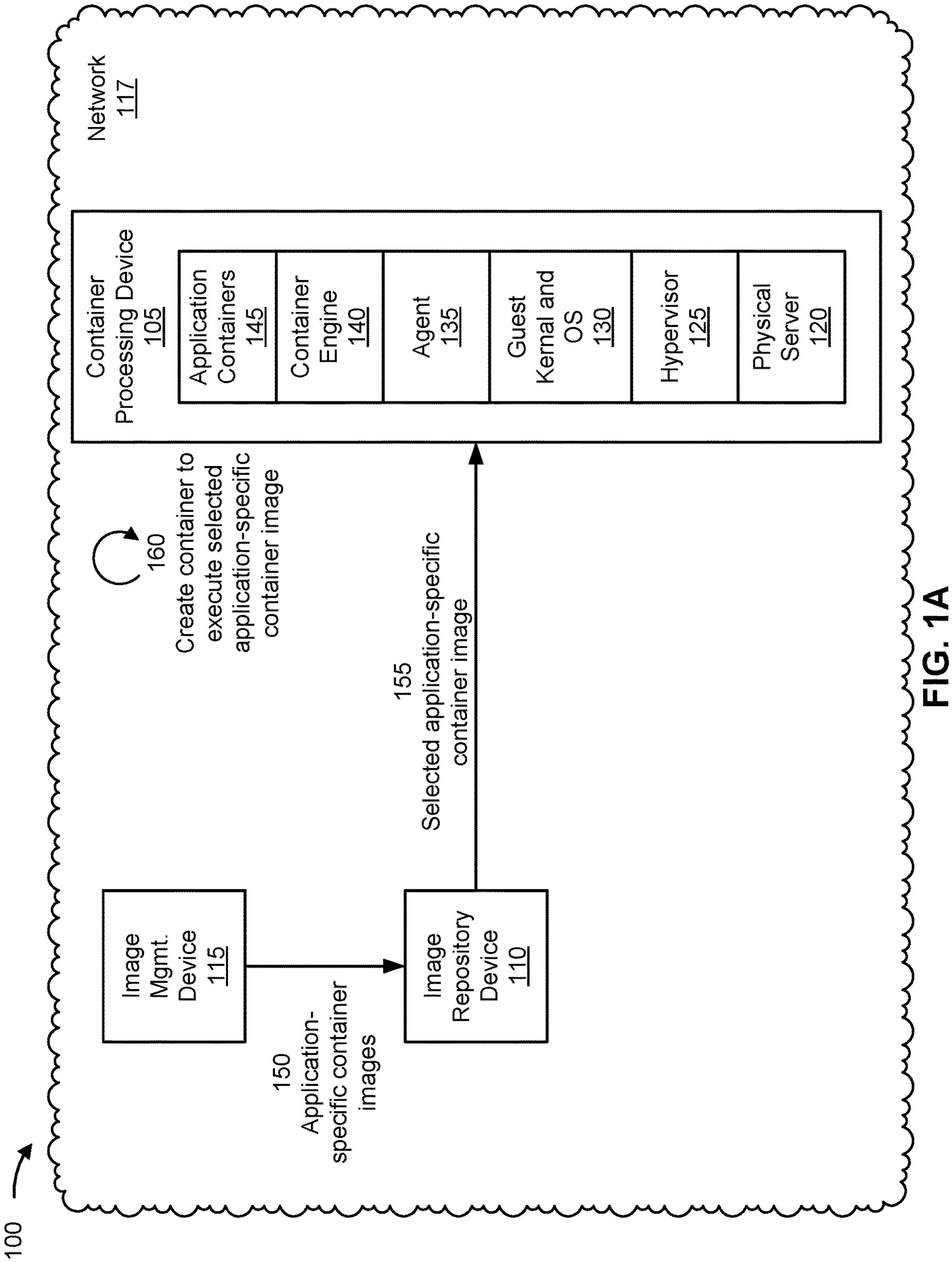
FIGS. 1A-1B are diagrams of an example implementation associated with a container-based processing environment, in accordance with some embodiments of the present disclosure.

The following detailed description of example implementations refers to the accompanying drawings. The same reference numbers in different drawings may identify the same or similar elements.

Container-based processing environments enable secure processing of applications in a serverless computing environment or a similar environment. An application developer may provide an application-specific image, such an application-specific container image (e.g., an application-specific Docket image) or a similar image, to be run in the container-based processing environment. Docker is an open platform for developing, shipping, and running applications that enables developers to package and run an application in a loosely isolated environment called a container. Docker and similar platforms provide isolation and security to allow a serverless computing environment or a similar platform to run many containers simultaneously on a given host. Containers are lightweight and contain everything needed to run the application, so that developers do not need to rely on what is currently installed on the host. For example, a container may include an operating system (OS) layer, an application language library layer, an application code layer (e.g., a binary file), among other layers, that are used to execute the application within the container and/or independent of host software and/or OSs.

In some examples, as part of a container-based processing architecture (e.g., a Docker-based architecture), a customer of a serverless computing environment (e.g., an application team) builds their application code and creates an application binary file (e.g., a .jar file or a .zip file) as part of their continuous improvement/continuous development (CI/CD) pipeline. The customer may put the application binary inside a container image, resulting in an application-specific container image. The customer may hand the application-specific container image over to a serverless computing environment hosting provider or a similar provider, such as Amazon Web Services (AWS) Serverless Fargate, or a similar provider. The serverless computing environment hosting provider may load the application-specific container image to create a container to serve a request from a user of the application. Accordingly, in such examples, the responsibility of a customer of the serverless computing environment (e.g., an application development team) is to create an application-specific container image, while the responsibility of serverless computing environment hosting provider or a similar provider is to load the application-specific container image and/or to run the application-specific container to serve user requests.

In some examples, an application-specific container image may need to be updated, such as when a vulnerability arises in an OS associated with the application (e.g., an OS layer of the application-specific container image). In some examples, updating an OS layer of the application-specific container image or a similar application-specific container image may be referred to as rehydrating the OS layer of the image. Moreover, in some examples, the OS layer may be associated with a base image, which is an image upon which multiple applications may be built, such as by adding application-specific code and/or an application binary to the base image, and/or that includes the OS layer, an application library layer, and/or similar layers. Accordingly, updating an OS layer of the application-specific container image or a similar application-specific container image may be referred to as rehydrating the base image.

For example, upon detecting a vulnerability in an OS, an OS provider may provide, to various customers, an updated version of the OS and/or may provide a security patch for the OS to address the vulnerability. An application team may then update (e.g., rehydrate) application-specific container images to include the updated OS and/or to include the security patch for the OS. This may be time and/or resource intensive, particularly for application teams in charge of numerous applications (and thus numerous application-specific container images). For example, an entity-level application team may spend approximately half of its time and/or power, computing, and network resource consumption rehydrating application-specific container images in order to address vulnerabilities in an OS or otherwise.

Some implementations described herein enable rehydration of a universal container base image without requiring updates to numerous application-specific container images (e.g., application-specific Docker images). In some implementations, rehydration of a universal container base image without requiring updates to numerous application-specific container images is achieved by separating a an image including an OS layer, an application library layer, and/or similar layers from application-specific code (e.g., an application binary file) within a file repository. Put another way, the application binary file may be removed from the universal container base image, such that the serverless computing environment may separately retrieve the universal container base image and the application specific code when running a particular application. In some implementations, the universal container base image may not include hard-coded application binary information, but instead the universal container base image may include a startup script or similar instructions that includes a dynamic variable that is to be replaced with application-specific code during container runtime (e.g., the application-specific code may be injected in the container during container runtime), such as application-specific code that is pulled from an application code repository or a similar system. As a result, if an OS layer or a similar layer of the universal container base image needs to be updated, such as to address a security vulnerability in OS layer or the like, a single universal container base container used for multiple applications may be updated, without requiring numerous (e.g., thousands) of application-specific container images (e.g., application-specific Docker images) to be rehydrated. As a result, time spent rehydrating application-specific container images may be reduced, and/or power, computing, and network resource consumption otherwise required to rehydrate numerous application-specific container images may be conserved.

Figure 1B:
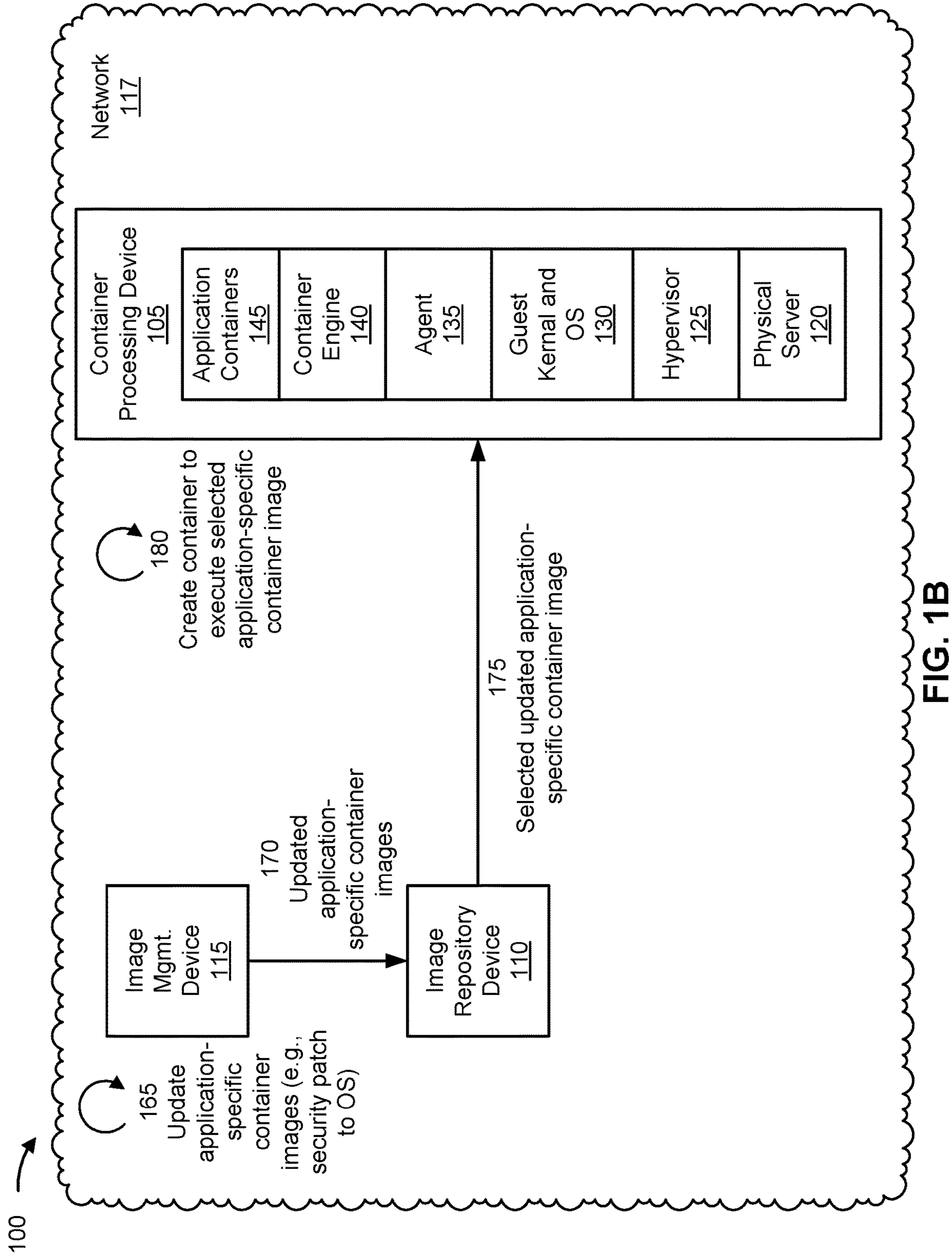

FIGS. 1A-1B are diagrams of an example implementation 100 associated with a container-based processing environment. As shown in FIGS. 1A-1B, example implementation 100 includes a container processing device 105 (e.g., a container runtime processing device, such as a Docker processing device or a similar device), an image repository device 110, and an image management device 115. The container processing device 105, the image repository device 110, and/or the image management device 115 may be in communication with one another, such as via a network 117. These devices are described in more detail below in connection with FIG. 3 and FIG. 4.

In some examples, the container processing device 105 may be a device associated with a container-based processing environment (e.g., a container runtime processing environment, such as a serverless computing environment or the like) that is configured to retrieve an image from a repository (e.g., the image repository device 110), create a container based on the image in order to run an application associated with the image in the container-based processing environment separate from other applications (e.g., other containers) operating in the container-based processing environment, and/or serve requests from users of the application. In that regard, the container processing device 105 may include one or more layers and/or devices associated with processing and/or hosting container-based applications. In some examples, the container processing device 105 may be associated with an AWS service, such as an AWS serverless Lambda service, an AWS elastic container service (ECS) serverless Fargate service, or a similar AWS service, while, in some other examples, the container processing device 105 may be associated with a cloud provider of a serverless container service other than an AWS service. In examples associated with an AWS ECS serverless Fargate service, an entity (e.g., an application team of an entity) using the AWS ECS serverless Fargate service may build application code and create an application binary (e.g., a .jar file or a .zip file) as part of a CI/CD pipeline, and the entity may put the application binary inside a container image (resulting in an application-specific container image) and/or provide the application-specific container image to AWS. AWS may load the application-specific container image during runtime and/or may start an application container from the application-specific container image to serve customer requests. In this way, the entity's application binary may be included in a an application-specific container image that may sit at a top layer at AWS (e.g., a top layer of the container processing device 105, such as an application container layer 145 described in more detail below), with remaining lower layers being managed by AWS. In this way, AWS ECS serverless Fargate abstracts an entity compute cloud (EC2) plane, thereby saving numerous EC2 rehydration hours across the entity.

In some examples, the container processing device 105 may include, and/or may be associated with, a data plane stack that includes a physical server layer 120, a hypervisor layer 125, a guest kernel and OS layer 130, an agent layer 135, a container engine layer 140, and/or an application container layer 145. The physical server layer 120 may include computing resources (e.g., hardware and software components) used to serve applications, data, and the like to customers, such as a personal computer, a server in a data center, or a similar computing device that runs on an operating system and/or that includes components such as the hardware components described below in connection with FIG. 4. In some examples, the physical server layer 120 may provide all the necessary computing resources for virtual machines (VM), which is described in more detail below in connection with FIG. 3. The hypervisor layer 125 may provide hardware virtualization and/or may isolate guests from one another in the container-based processing environment. The guest kernel and OS layer 130 may provide OS virtualization using kernel primitives, such as Namespaces, Cgroups, or the like. The agent layer 135 may provision containers in the task boundary, set up networking, provide role credentials, monitor containers, provide telemetry for containers, and/or perform similar processes. The container engine layer 140 may download container images, create container root filesystems, start application processes with container boundaries, provide Cgroup integrations for containers, stream container logs, and/or perform similar processes. And the application container layer 145 may execute business logic inside containers and/or perform similar processes.

As shown in FIGS. 1A-1B, the container processing device 105 may be capable of downloading an application-specific container image (e.g., application-specific Docker images) from a repository, creating a container to execute an application associated with the application-specific container image in the container-based processing environment, and/or executing the application within the container to server user requests. For example, as shown in FIG. 1A, and as indicated by reference number 150, the image management device 115 (e.g., one or more computing devices associated with an application development team, or the like) may create one or more application-specific container images (e.g., one or more application-specific Docker images) and/or may store the one or more application-specific container images in the image repository device 110 (e.g., within a container image repository associated with the image repository device).

As indicated by reference number 155, when a certain application is to be run in the container-based processing environment (e.g., a serverless computing environment), the container processing device 105 may select and retrieve an application-specific container image (e.g., an application-specific Docker image) that is associated with the application from the image repository device 110. As indicated by reference number 160, upon retrieving the application-specific container image from the image repository device 110, the container processing device 105 may create a container to execute the selected application-specific container image, thereby isolating the application from other applications running the container-based processing environment (which themselves may be operating in corresponding containers).

In some cases, the one or more application-specific container images may need to be updated, such as for a purpose of updating and/or patching an OS layer (e.g., a base image) associated with the application-specific container images in order to address a security vulnerability or the like. For example, upon detecting a security vulnerability in an OS, an OS provider may update the OS and provide the updated OS to various application development teams and/or similar customers. Upon receiving the updated OS, an application development team or a similar entity may update (e.g., rehydrate) each of multiple application-specific container images (e.g., applications-specific Docker images) associated with that particular OS, such as by replacing an OS layer of each application-specific container image with the updated OS and then rebuilding each application-specific container image via a CI/CD process. For example, as shown in FIG. 1B, and as indicated by reference number 165, the image management device 115 may update multiple application-specific container images, such as for a purpose of performing a security patch to a vulnerable OS associated with the application-specific container images. This process may be time consuming and resource intensive, particularly for application teams in charge of numerous application-specific container images.

As indicated by reference number 170, after rehydrating the numerous application-specific container images, the image management device 115 may deposit the updated application-specific container images at the image repository device 110 such that the container processing device 105 may retrieve the updated application-specific container images during subsequent executions of the applications. More particularly, as indicated by reference number 175, when a certain application is to be run in the container-based processing environment (e.g., a serverless computing environment), the container processing device 105 may select and retrieve an updated application-specific container image from the image repository device 110 that is associated with the application. And, as indicated by reference number 180, upon retrieving the updated application-specific container image from the image repository device 110, the container processing device 105 may create a container to execute the selected application-specific container image, thereby isolating the application from other applications running the container-based processing environment (which themselves may be operating in corresponding containers). As new versions of an OS become available (e.g., as additional security patches are implemented), the operations described above in connection with FIG. 1B may need to be repeated, which may be time, power, computing, and network resource intensive, as described above.

In this way, an application team associated with an entity that uses a service provided by the container processing device 105 (e.g., an AWS ECS serverless Fargate service or a similar serverless container processing service) may be responsible for business application requirements, and an operation team of the entity may be responsible for setting up a pipeline (e.g., a CI/CD pipeline) to build the application, create an application binary version, containerize (e.g., Dockerize) the application (e.g., to create an application-specific container image), and store the application-specific container image in a registry (e.g., an ECS container registry) and/or a repository (e.g., a binary repository). A cloud provider of a serverless container service (e.g., AWS or a similar provider) may in turn be responsible for pulling the application-specific container image at runtime and/or running the application, as described above. Thus, a responsibility of a customer of a cloud provider of a serverless container service or a similar serverless environment may be to create the application-specific container image, and a responsibility of the cloud provider of a serverless container service may be to load the application-specific container image and run the application in a container-based environment. In this regard, the above-described architecture (e.g., an AWS ECS serverless Fargate service or a similar serverless container service) may eliminate a certain infrastructure maintenance burden at an entity, such as by eliminating numerous EC2 rehydration hours at the entity. However, the above-described architecture introduces additional entity overhead in terms of managing container image rehydration. According to some implementations of the disclosure, a universal container base image (e.g., a universal Docker base image) and/or a universal container image build pipeline (e.g., a universal Docker image build pipeline) may be implemented in order to reduce time and/or resource consumption associated with managing container image rehydration. Aspects of a universal container image and/or a universal container image build pipeline are described in more detail below in connection with FIGS. 2A-2D.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

FIGS. 2A-2D are diagrams of an example implementation 200 associated with a scalable and dynamic process for rehydrating universal container base images. As shown in FIGS. 2A-2D, example implementation 200 includes the container processing device 105, the image repository device 110, and the image management device 115, which were described above in connection with FIG. 1. In some implementations, the example implementation 200 may further include a binary file repository device 205 that is associated with a repository for hosting applications-specific code (e.g., application binary files). As shown by the dashed-line box indicated by reference number 210, in some implementations the binary file repository device 205 may be associated with the image repository device 110. For example, in some implementations the binary file repository device 205 and the image repository device 110 may be associated with the same device and/or the same repository. The container processing device 105, the image repository device 110, the image management device 115, and the binary file repository device 205 are described in more detail below in connection with FIG. 3 and FIG. 4. In some implementations, the example implementation 200 may be associated with a cloud provider of a serverless container service, such as an AWS ECS serverless Fargate service as described above in connection with FIGS. 1A-1B, or a similar serverless container service.

In some implementations, the container processing device 105 may be configured to create a container based on a universal container base image (e.g., a universal Docker base image, such as an image including an OS layer, an application library layer, and/or similar layers that is applicable to multiple applications) and inject application-specific code (e.g., an application binary file) into the container during runtime. By maintaining the application-specific code separate from the universal container base image, a single universal container base image that is associated with multiple applications may be updated when needed (e.g., to perform a security patch or the like), thereby reducing time, power, computing, and network resource consumption otherwise required to patch numerous application-specific container images. Put another way, in response to receiving an updated OS or the like, an application development team may not need to rehydrate numerous (e.g., millions) of application components across an entity, but instead may perform a limited number of rehydration tasks associated with a universal container base image.

Figure 2A:
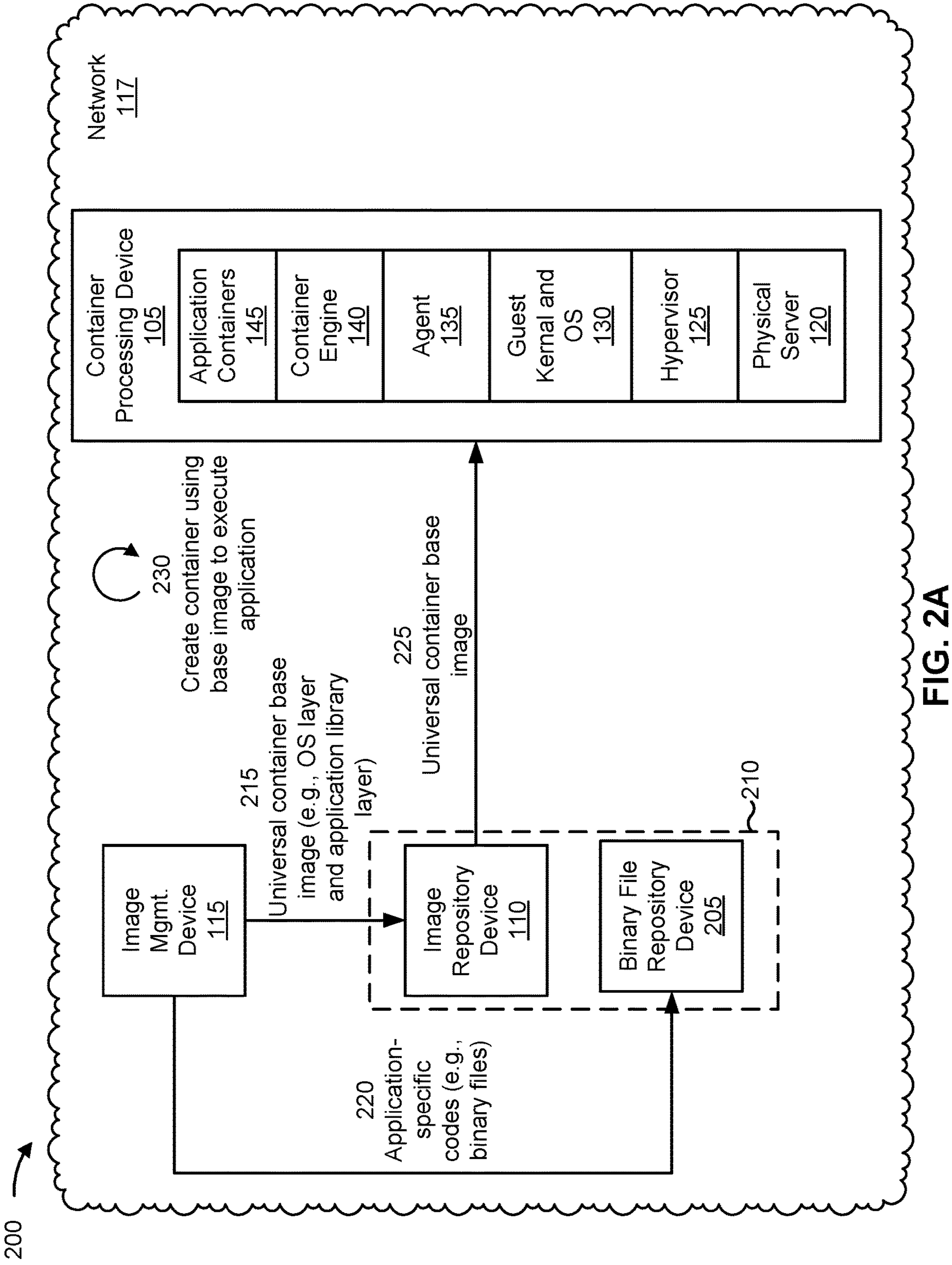
FIGS. 2A-2D are diagrams of an example implementation associated with a scalable and dynamic process for rehydrating universal container base images, in accordance with some embodiments of the present disclosure.

More particularly, as shown in FIG. 2A, and as indicated by reference number 215, a customer associated with the image management device 115 (e.g., an application development team associated with an entity or a similar customer) may create a universal container base image (e.g., a universal base image associated with Docker, sometimes referred to as a universal Docker base image, or a universal base image associated with a similar container-processing environment) and/or may deposit the universal container base image in an image repository associated with the image repository device 110. In some implementations, the universal container base image may be an entity-level universal container base image (e.g., a universal base image associated with multiple entity-wide applications, which is described in more detail below). Additionally, or alternatively, the universal container base image may be associated with an OS (e.g., an OS layer) used to run the multiple applications, an application library (e.g., an application library layer) associated with the multiple applications, and/or similar layers. More particularly, in some implementations, the universal container base image may include a set of instructions associated with an OS associated with multiple applications, and/or the universal container base image may include a set of instructions associated with an application language library associated with the multiple applications. In some implementations, the universal container base image may be associated with Docker. For example, the universal container base image may be a universal Docker base image. As further indicated by reference number 215, the customer and/or the image management device 115 may deposit the universal container base image at the image repository device, such as in a container image repository associated with the image repository device 110.

As indicated by reference number 220, the customer associated with the image management device 115 (e.g., an application development team associated with an entity or a similar customer) may also create one or more application binary files separate from the universal container base image and/or may deposit the application binary files in a binary file repository associated with the binary file repository device 205. In some implementations, the application binary files may include application-specific code that is configured to run using the OS associated with the universal container base image and/or the application language library associated with the universal container base image. For example, the application binary files may be configured to be injected into a container associated with the universal container base image during a runtime of the container. In that regard, the application binary files may each include a set of instructions associated with one application, of the multiple applications associated with universal container base image. As further indicated by reference number 220, the customer and/or the image management device 115 may deposit the application binary files (e.g., application-specific code) at the binary file repository device 205, such as in a binary file repository associated with the binary file repository device 205.

In some implementations, the customer associated with the image management device 115 may create an application binary file for each of the multiple applications associated with the universal container base image and/or may deposit each of the application binary files at the binary file repository device. In this regard, the container processing device 105 may be configured to select a certain application binary file for an application to be executed in a container and/or inject the application binary file into the container during runtime of the container depending on a specific application that is to be run in the serverless computing environment.

More particularly, as indicated by reference number 225, in order to execute an application, the container processing device 105 may receive the universal container base image from the image repository device 110 (e.g., from a container image repository associated with the image repository device 110). As indicated by reference number 230, the container processing device 105 may create a container to execute an application in the container-based processing environment (e.g., the serverless computing environment) based on the universal container base image. More particularly, the container processing device 105 may create a container using the instructions included in the universal container base image, such as the instructions associated with the OS, the application language library, and/or any additional instructions included in the universal container base image.

Figure 2B:
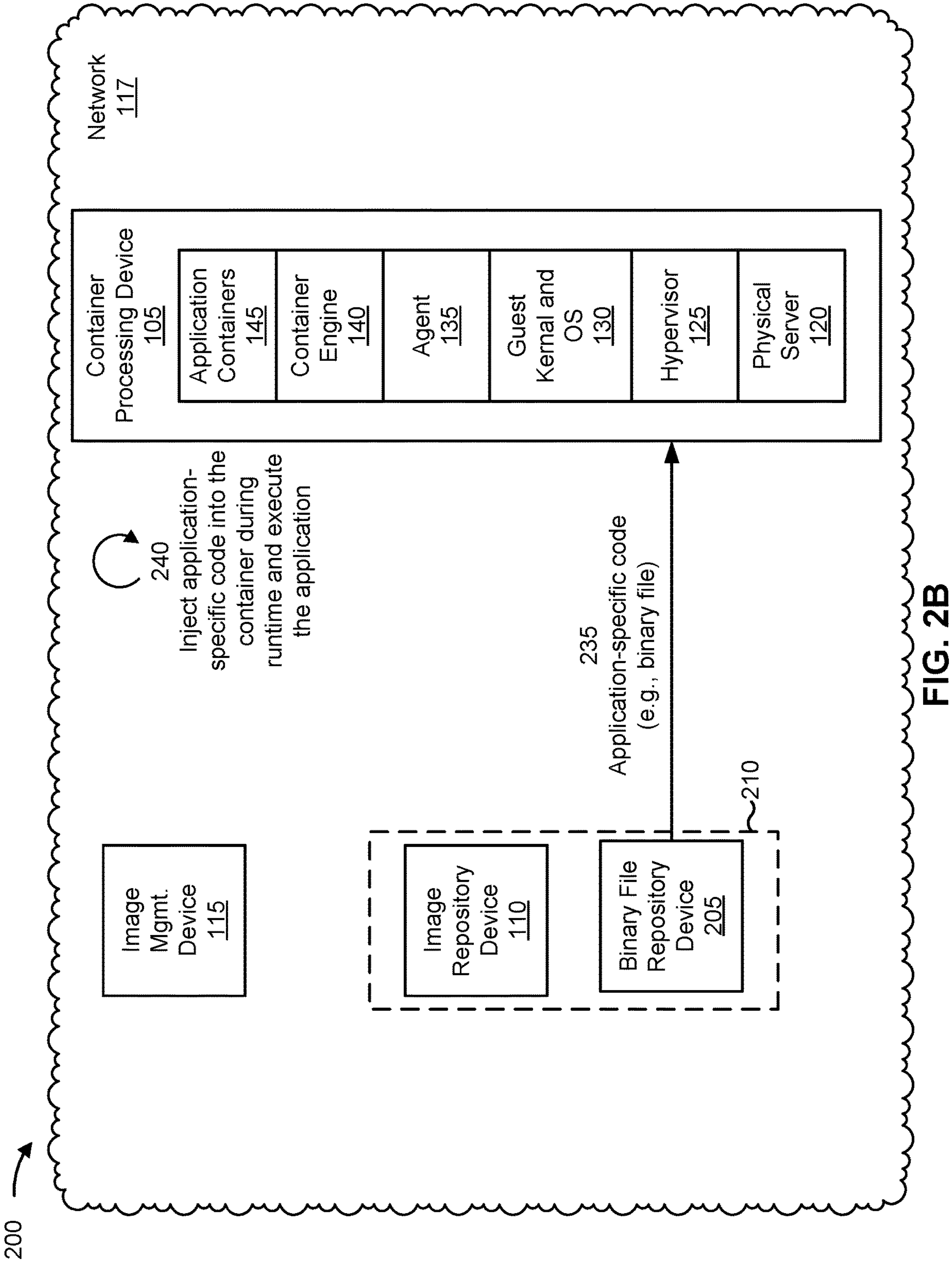

As shown in FIG. 2B, and as indicated by reference number 235, when executing a specific application, the container processing device 105 may select and retrieve, from the binary file repository device 205, an application-specific code (e.g., an application binary file) that is separate from the universal container base image and that is associated with the specific application to be run. As described above in connection with reference number 220, the application-specific code may include a set of instructions associated with an application, of the multiple applications associated with the universal container base image. In some implementations, the container processing device 105 may retrieve the application-specific code in response to an instruction associated with a startup procedure for the container created using the universal container base image. For example, the universal container base image may include a startup script or similar instructions that includes a dynamic variable that is to be replaced with application-specific code during container runtime. In such implementations, the dynamic variable may be set to a location of the application-specific code in the binary file repository device such that the container processing device 105 may retrieve the application-specific code from the binary file repository device during runtime of the container.

More particularly, as shown by reference number 240, the container processing device 105 may inject the application-specific code into the container during runtime. Additionally, or alternatively, the container processing device 105 may execute the application within the container based on the instructions contained in the universal container base image and the instructions contained in the application-specific code, among other instructions. More particularly, the container processing device 105 may execute the application based on at least the set of instructions included in the universal container base image and the set of instructions included in the application-specific code.

Figure 2C:
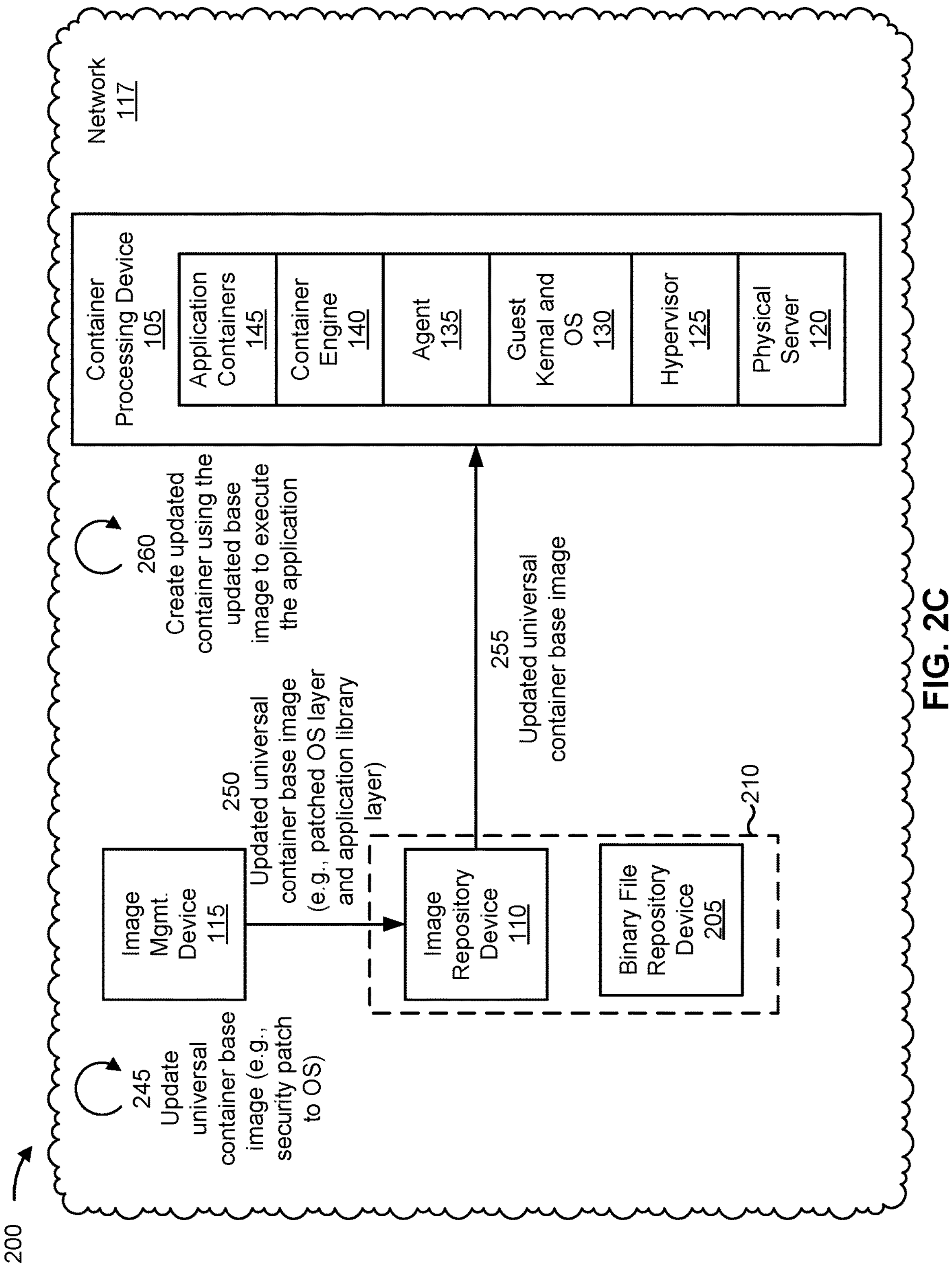

In this regard, by abstracting the OS layer and other layers from the application-specific code (e.g., the application binary file), the universal container base image may be periodically updated, such as for a purpose of patching a security vulnerability or the like, without requiring rehydration of numerous application-specific container images (e.g., numerous application-specific Docker images). More particularly, an entity may maintain a single and/or universal container base image that is associated with multiple applications, with each of the application's code maintained separate from the universal container base image, and thus the entity may only need to update the single universal container base image, when necessary. For example, as shown in FIG. 2C, and as indicated by reference number 245, a customer associated with the image management device 115 (e.g., an entity-level application development team) may create an updated universal container base image, which may include a set of instructions associated with an updated OS associated with the multiple applications (e.g., which may be associated with a version of the OS that includes a security patch, or the like). As indicated by reference number 250, the customer may deposit the updated universal container base image at the image repository device 110 (e.g., in a container image repository associated with the image repository device 110). Notably, in this example, the customer may refrain from updating the application-specific code associated with the various applications, thus conserving time, power, computing, and network resources previously associated with rehydrating the numerous application-specific container images (e.g., the numerous application-specific Docker images).

As indicated by reference number 255, when the application is to be run in the container-based processing environment (e.g., the serverless computing environment), the container processing device 105 may receive the updated universal container base image from the image repository device (e.g., a container image repository associated with the image repository device 110). Moreover, as indicated by reference number 260, the container processing device 105 may create an updated container to execute an application in the container-based processing environment (e.g., the serverless computing environment) based on the updated universal container base image. More particularly, the container processing device 105 may create an updated container using the instructions included in the updated universal container base image, such as the instructions associated with the updated OS, the application language library, and/or any additional instructions included in the updated universal container base image.

Figure 2D:
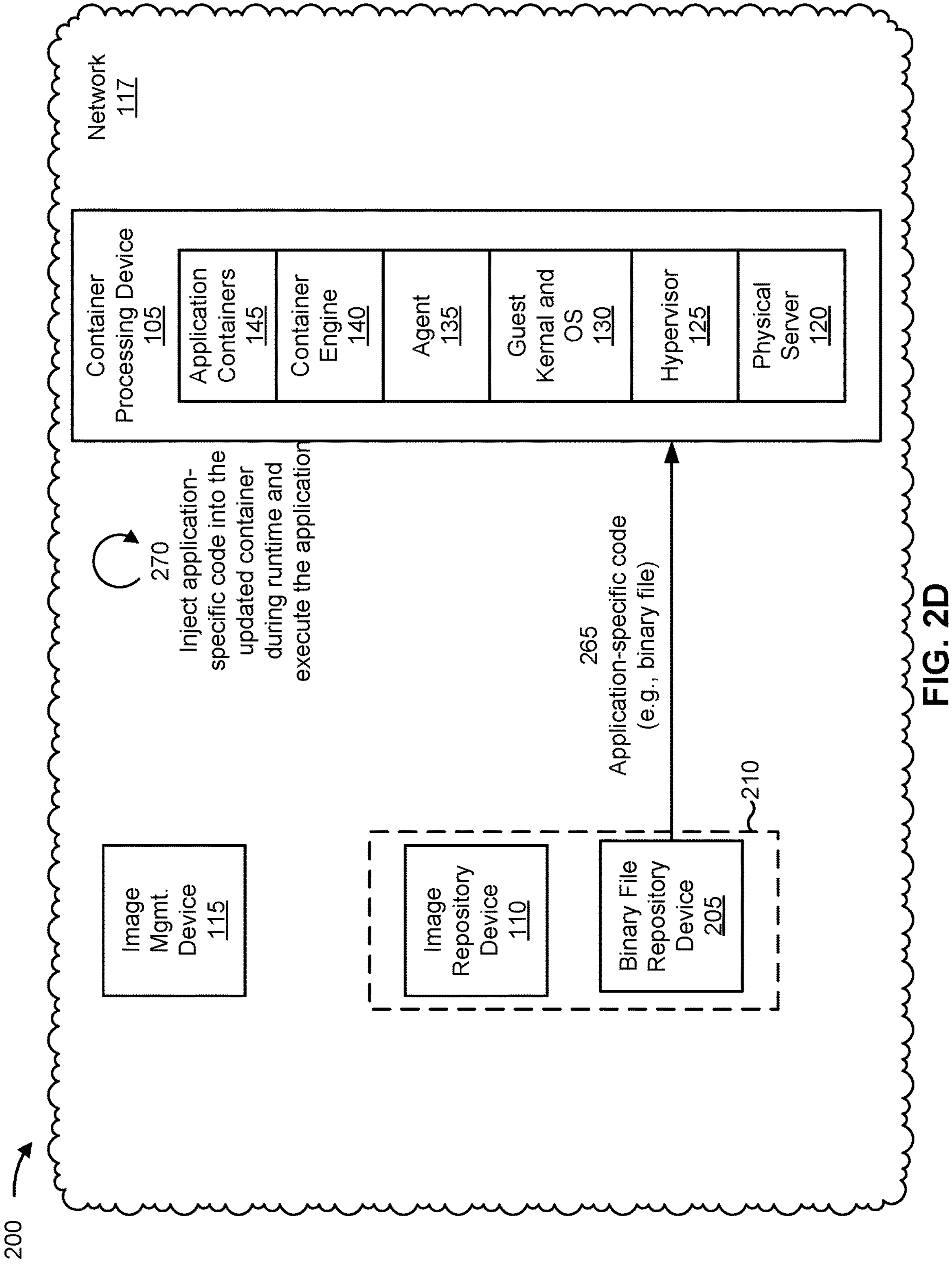

As shown in FIG. 2D, and as indicated by reference number 265, in order to execute the application, the container processing device 105 may retrieve, from the binary file repository device 205, the application-specific code (e.g., an application binary file) that is separate from the updated universal container base image. As described above in connection with reference number 235, the application-specific code may include a set of instructions associated with an application, of the multiple applications associated with the updated universal container base image. In some implementations, the container processing device 105 may retrieve the application-specific code in response to an instruction associated with a startup procedure for the container created using the updated universal container base image. For example, the updated universal container base image may include a startup script or similar instructions that includes a dynamic variable that is to be replaced with application-specific code during runtime of the updated container. In such implementations, the dynamic variable may be set to a location of the application-specific code in the binary file repository device 205 such that the container processing device 105 may retrieve the application-specific code from the binary file repository device 205 during runtime of the updated container.

As shown by reference number 270, the container processing device 105 may inject the application-specific code into the updated container during runtime. Additionally, or alternatively, the container processing device 105 may execute the application within the updated container based on the instructions contained in the updated universal container base image and the instructions contained in the application-specific code, among other instructions. More particularly, the container processing device 105 may execute the application based on at least the set of instructions included in the updated universal container base image and the set of instructions included in the application-specific code.

In some implementations, by utilizing the above-described architecture, a customer associated with the image management device 115 (e.g., an entity-level application development team or a similar customer) may reduce time and resource consumption associated with rehydrating numerous entity-wide application-specific container images (e.g., application-specific Docker images), or the like. More particularly, in response to receiving an updated OS or the like, an application development team may not need to rehydrate numerous (e.g., millions) of application components across an entity. Instead, a universal container base image build team of the entity may update an universal container base image one time, and deploy the updated universal container base image entity-wide for the various application build teams' use. Put another way, the universal container base image build team of the entity may create one or more universal container base images (e.g., one or more universal Docker base images), one for each OS and/or application language library being used by the entity's various application build teams, and/or may provide the one or more universal container base images to the various application build teams. In some implementations, the universal container base image build team may set up a CI/CD pipeline to build the one or more universal container base images, such as whenever the universal container base image build team learns of an OS version vulnerability. In some implementations, an application build team may add additional application-specific third party binary (e.g., non-application-code binary) on top of a universal container base image, such as via part of the application build team's CI/CD pipeline.

In some implementations, a universal container base image startup script (e.g., a Docker startup script) may be standardized and/or included as part of the universal container base image build team's one or more universal container base images. The universal container base image startup script may not include any hardcoded application binary information, but may instead include a dynamic variable that may be replaced during container runtime (e.g., with application code binary). In some implementations, the universal container base image build team may push the one or more universal container base image metadata into an entity repository or a similar database for leverage during a pipeline build time. Additionally, or alternatively, the universal container base image build team may provide a customized version of the universal container base image build team's container image build pipeline (e.g., Docker image build pipeline), such as for a purpose of enabling the application teams to build an application-specific container base image on top of the one or more universal container base images.

In this regard, an application build team may utilize a build pipeline with an optional container (e.g., Docker) build stage. For example, an optional container stage may exist in the application build CI/CD pipeline, however no application container image build may occur at the container stage. Instead, the container stage may pull the latest universal container base image version (e.g., the vulnerability-free container base image provided by the universal container base image build team of the entity) from the entity repository or similar database, and the application build CI/CD pipeline may perform a scan using an image scanning security tool (e.g., a Docker image scan tool) on the universal container base image.

In this regard, when building a certain application, an application build team may push application code changes to an application code component repository. The application build CI/CD pipeline may then begin a CI/CD process by checking out the application code from the application code component repository. The application build CI/CD pipeline may perform an application build and/or static code analysis (SCA) stage as part of a CI stage of the application build CI/CD pipeline. The application build CI/CD pipeline may thus create an application code binary (e.g., a .jar or .zip file) with a particular artifact version, and/or the application build CI/CD pipeline may deposit the application code binary to a repository and/or a similar database (e.g., the binary file repository device 205). The application build CI/CD pipeline may also include an optional container build stage. For example, based on a status of a flag (sometimes referred to as is_docker_build_required, but which in some other implementations may be any suitable variable used for pipeline identification purposes) associated with a build file of the application, a container stage of the application build CI/CD pipeline may determine whether to build an application-specific container image or whether to pull a universal container base image from the entity repository or similar database. In that regard, if the flag (e.g., is_docker_build_required or a similar variable) is set to true, an application-specific container image may be built at the container stage. On the other hand, if the flag is set to false, no application-specific container image may be built at the container stage. Instead, the container startup script may include business logic to dynamically load the application code binary from a repository (e.g., the binary file repository device 205) during container startup time. Accordingly, the application build CI/CD pipeline may set an application binary artifact version and/or a universal container base image version to a pipeline context which may later be read by a cloud provider of a serverless container service.

The infrastructure as code (IAC) tools may read the pipeline context and thus create a container manifest (e.g., a cloud provider serverless container definition) dynamically by setting a variable (sometimes referred to as containerImage, but which in some other implementations may be any other suitable variable) to the universal container base image (e.g., the universal Docker base image) and/or by setting an application binary artifact version and/or an artifact location as part of a cloud provider serverless container definition environment variables. Accordingly, during container startup by a cloud provider of a serverless container service, the container processing device 105 may pull the universal container base image (e.g., the universal Docker base image) from a repository (e.g., the image repository device 110), and/or the container processing device 105 may download the application binary from a repository (e.g., the binary file repository device 205). A same pattern (e.g., pulling the universal base image from a repository as part of container startup and/or downloading the application binary from a repository) may be applied at a quality assurance stage of the application build CI/CD pipeline and/or a product deployment stage of the application build CI/CD pipeline.

In this way, an application binary file may be removed from the universal container bases image (e.g., the universal container base image provided by a customer to a cloud provider of a serverless container service), which may seemingly be contrary to an immutability principle and/or a reproducibility principle of utilizing container images in container-based environments. However, while removing the application binary from the container image and passing the application binary during runtime may be contrary to the immutability principle, removing the application binary from the container image and passing the application binary during runtime may not be contrary to the immutability principle at a cloud provider serverless container definition file level. A cloud provided serverless container definition file (e.g., a template file) may be an immutable file (e.g., a snapshot) that holds a container image version information (e.g., containerImage), other configuration information (e.g., virtual central processing unit (vCPU), memory, and/or the like), and/or environment variables, which may not be able to be mutated once created. More particularly, when the application build CI/CD pipeline creates the cloud provider serverless container definition revision, the application build CI/CD pipeline may set the container base image version and/or the application artifact version as part of the template, such that the container base image version and/or the application artifact cannot be altered later. Moreover, in some implementations, the application build CI/CD pipeline may use a gsign or a similar signature security software in order to add an encrypted signatures to each cloud provider serverless container definition revision.

Moreover, the reproducibility principle may be associated with an ability to take an application container image and run the image anywhere (e.g., locally at a developer, within the cloud, or the like), with the application container image working seamlessly as long as the necessary parameters are passed to the container image. From an auditing and/or debugging incident perspective, the reproducibility principle aims to reproduce what container image was running in a cloud environment on a particular day. In some implementations, in order to improve reproducibility associated with a universal container base image and/or application-specific code, a manifest file (e.g., a manifest JSON file) may be created (e.g., the by the application build CI/CD pipeline) that replicates the cloud provider serverless container definition file described above and/or that is tagged with the application binary artifact version. In such implementations, the application build CI/CD pipeline may store the manifest file in the repository where the application binary artifact resides (e.g., the binary file repository device 205). In that regard, if a developer, auditing team, and/or a similar entity wishes to run a specific version (e.g., associated with a specific day) of an application, such as for debugging and/or auditing purposes, the developer, auditing team, and/or the similar entity may retrieve the manifest file and/or the application binary artifact from the repository and/or may run the container image. For example, the developer, auditing team, and/or the similar entity may utilize a utility script to pull both files (e.g., the application binary and the universal container base image) and/or run the container with information listed in the manifest file and by injecting the application binary at runtime.

Additionally, or alternatively, as part of a deployment pre-hook stage of the application build CI/CD pipeline, a metadata script or similar script may be utilize to infer a latest container base image version from the entity repository or similar database (e.g., the image repository database 110) and/or to infer an application artifact currently running version (e.g., in development, quality assurance, production, or the like) from a certain entity, database, cloud environment, cloud provider serverless container service, or a similar location. Accordingly, the application build CI/CD pipeline may set an application binary artifact version and/or a universal container base image version to a pipeline context which may later be read by a cloud provider of a serverless container service.

Accordingly, during container startup by a cloud provider of a serverless container service, the universal container base image (e.g., the universal Docker base image) may be pulled from a repository (e.g., the image repository device 110), and/or the application binary maybe downloaded from a repository (e.g., the binary file repository device 205). In some implementations, a post-deployment hook (e.g., a post-deployment hook Lambda or a similar cloud function) may be utilized, such as for a purpose of running a component functional test before switching traffic to a new version of application that uses the universal container base image. In that regard, if a functional test associated with the new version of the universal base image fails, the container processing device 105 may decline to utilize the new version of the universal container base image and instead proceed with the old version of the universal container base image without switching traffic.

In this way, the OS or other components of a universal container base image (e.g., a universal Docker base image) may be periodically updated, such as for a purpose of performing a security patch or the like, without requiring rehydration of numerous entity-wide application-specific container images (e.g., application-specific Docker images), thereby conserving time, power, computing, and network resources otherwise require for application-specific container image rehydration.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
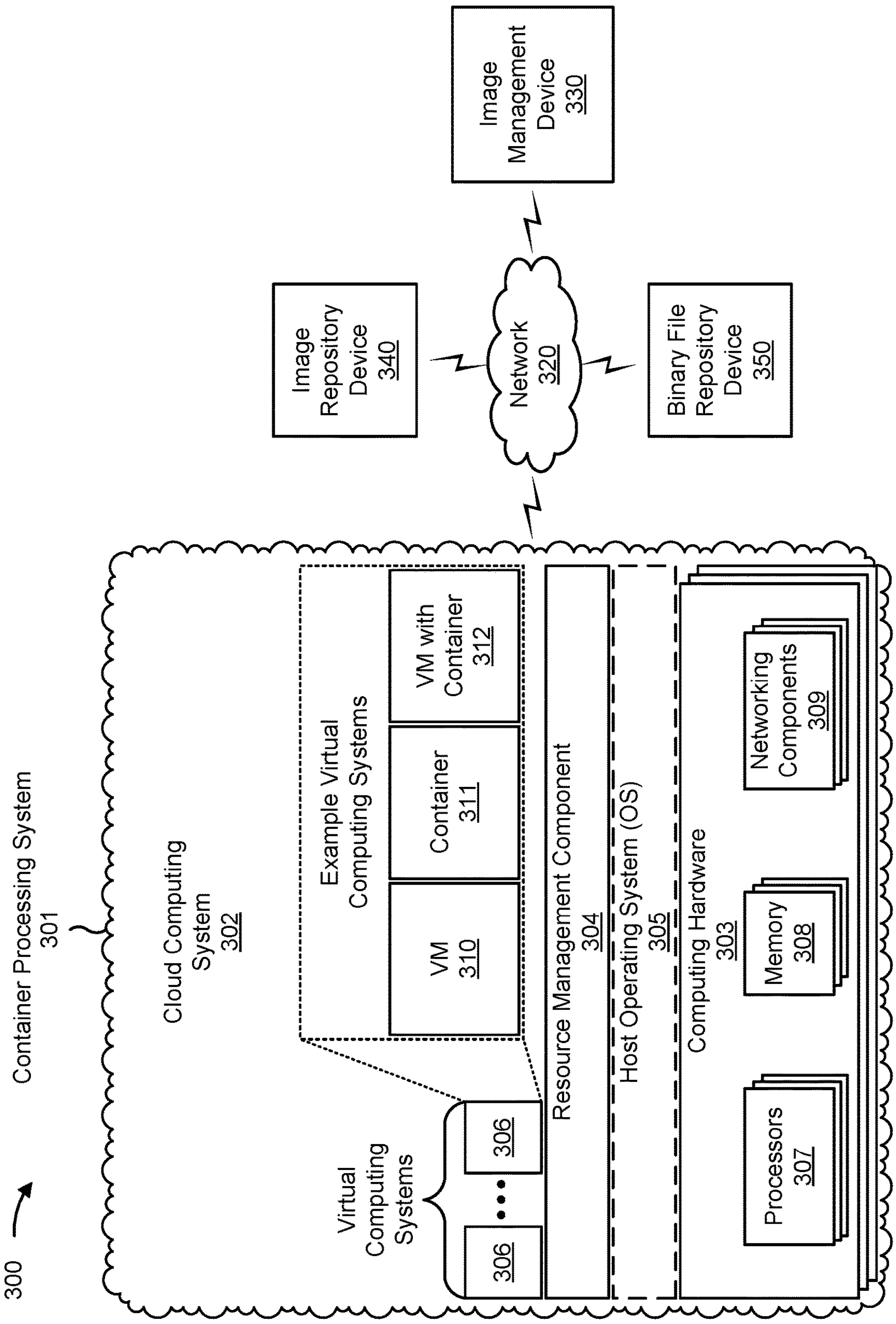
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a container processing system 301, which may include one or more elements of and/or may execute within a cloud computing system 302. The cloud computing system 302 may include one or more elements 303-312, as described in more detail below. Additionally, or alternatively, the cloud computing system 302 may be associated with the container processing device 105 and/or one or more layers associated with the container processing device 105 (e.g., the physical server layer 120, the hypervisor layer 125, the guest kernel and OS layer 130, the agent layer 135, the container engine layer 140, and/or the application container layer 145). As further shown in FIG. 3, environment 300 may include a network 320 (e.g., network 117), an image management device 330 (e.g., image management device 115), an image repository device 340 (e.g., image repository device 110), and/or a binary file repository device 350 (e.g., binary file repository device 205). Devices and/or elements of environment 300 may interconnect via wired connections and/or wireless connections.

The cloud computing system 302 may include computing hardware 303 (e.g., the physical server layer 120), a resource management component 304, a host OS 305 (e.g., the guest kernel and OS layer 130), and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., hypervisor layer 125 and/or a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager (e.g., container engine layer 140), such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the container processing system 301 may include one or more elements 303-312 of the cloud computing system 302, may execute within the cloud computing system 302, and/or may be hosted within the cloud computing system 302, in some implementations, the container processing system 301 may not be cloud-based (e.g., may be implemented outside of a cloud computing system) or may be partially cloud-based. For example, the container processing system 301 may include one or more devices that are not part of the cloud computing system 302, such as device 400 of FIG. 4, which may include a standalone server or another type of computing device. The container processing system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The image management device 330 may include hardware and corresponding resources from one or more computing devices, such as one or more computing devices associated with an application development team. For example, the image management device 330 may include hardware from a single computing device (e.g., a single personal computer (PC)) or from multiple computing devices (e.g., multiple PCs) capable of developing container images (e.g., container base images), binary files (e.g., application-specific code), or the like. The image management device 330 may include one or more processors, one or more memories, and/or one or more networking components. Examples of a processor, a memory, and a networking component (e.g., a communication component) are described elsewhere herein. In some implementations, the image management device 330 may include, or may be associated with, a software development hosting platform (e.g., GitHub), a CI/CD pipeline, and/or similar software development tools.

The image repository device 340 may include hardware and corresponding resources from one or more computing devices for hosting one or more container images. For example, the image repository device 340 may include hardware and corresponding resources from one or more computing devices for hosting a container image repository, as described elsewhere herein.

The binary file repository device 350 may include hardware and corresponding resources from one or more computing devices for hosting one or more binary files (e.g., application-specific code). For example, the image repository device 340 may include hardware and corresponding resources from one or more computing devices for hosting a binary file repository and/or an application code repository, as described elsewhere herein. In some implementations, the image repository device 340 and the binary file repository device 350 may be associated with the same device and/or set of devices, as described above in connection with reference number 210.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
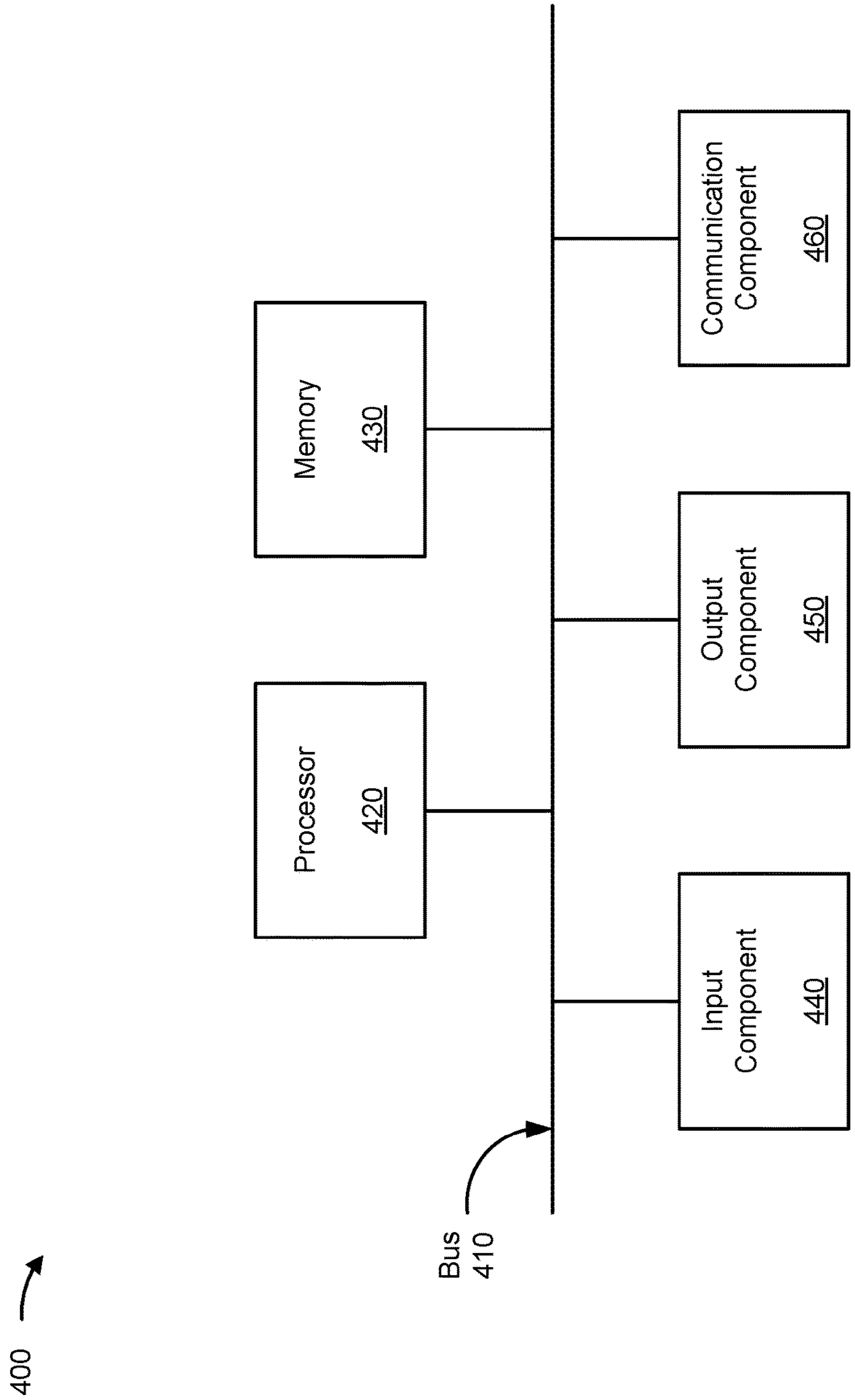
FIG. 4 is a diagram of example components of a device associated with a scalable and dynamic process for rehydrating universal container base images, in accordance with some embodiments of the present disclosure.

FIG. 4 is a diagram of example components of a device 400 associated with a scalable and dynamic process for rehydrating universal container base images. The device 400 may correspond to the container processing device 105, the image repository device 110, the image management device 115, the binary file repository device 205, the image management device 330, the image repository device 340, and/or the binary file repository device 350. In some implementations, the container processing device 105, the image repository device 110, the image management device 115, the binary file repository device 205, the image management device 330, the image repository device 340, and/or the binary file repository device 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
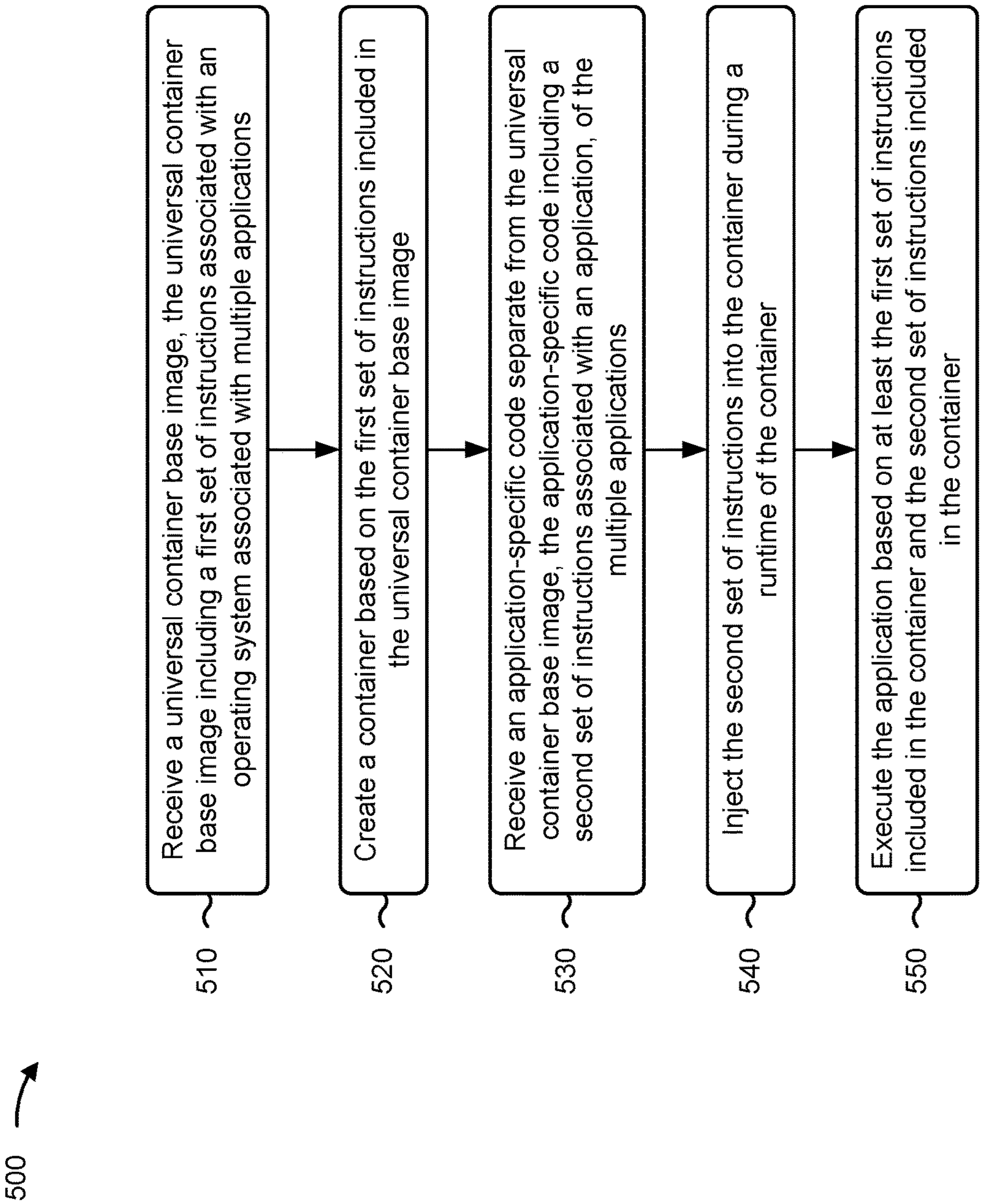
FIG. 5 is a flowchart of an example process associated with a scalable and dynamic process for rehydrating universal container base images, in accordance with some embodiments of the present disclosure.

FIG. 5 is a flowchart of an example process 500 associated with a scalable and dynamic process for rehydrating universal container base images. In some implementations, one or more process blocks of FIG. 5 may be performed by the container processing device 105. In some implementations, one or more process blocks of FIG. 5 may be performed by another device or a group of devices separate from or including the container processing device 105, such as the image repository device 110, the image management device 115, the binary file repository device 205, the image management device 330, the image repository device 340, the binary file repository device 350, and/or a virtual device associated with the cloud computing system 302. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a universal container base image, the universal container base image including a first set of instructions associated with an operating system associated with multiple applications (block 510). For example, the container processing device 105 (e.g., using processor 420, memory 430, input component 440, and/or communication component 460) may receive a universal container base image, the universal container base image including a first set of instructions associated with an operating system associated with multiple applications, as described above in connection with reference number 225 of FIG. 2B. As an example, in order to execute a container-based application for a particular customer, the container processing device 105 may retrieve a universal container base image associated with the customer, which may include an OS, an application language library, and similar base layers associated with the application, as described above.

As further shown in FIG. 5, process 500 may include creating a container based on the first set of instructions included in the universal container base image (block 520). For example, the container processing device 105 (e.g., using processor 420 and/or memory 430) may create a container based on the first set of instructions included in the universal container base image, as described above in connection with reference number 230 of FIG. 2A. As an example, the container processing device may create a container 311 for executing the application by executing instructions associated with the universal container base image, as described above.

As further shown in FIG. 5, process 500 may include receiving an application-specific code separate from the universal container base image, the application-specific code including a second set of instructions associated with an application, of the multiple applications (block 530). For example, the container processing device 105 (e.g., using processor 420, memory 430, input component 440, and/or communication component 460) may receive an application-specific code separate from the universal container base image, the application-specific code including a second set of instructions associated with an application, of the multiple applications, as described above in connection with reference number 235 of FIG. 2B. As an example, the container processing device 105 may retrieve an application binary file from a binary file repository, such as for a purpose of injecting the binary file into the container 311 during runtime, as described above.

As further shown in FIG. 5, process 500 may include injecting the second set of instructions into the container during a runtime of the container (block 540). For example, the container processing device 105 (e.g., using processor 420 and/or memory 430) may inject the second set of instructions into the container during a runtime of the container, as described above in connection with reference number 240 of FIG. 2B. As an example, the container processing device 105 may inject the application binary file into the container created using the Docker base image, such as by replacing a dynamic variable with the binary file during container runtime.

As further shown in FIG. 5, process 500 may include executing the application based on at least the first set of instructions included in the container and the second set of instructions included in the container (block 550). For example, the container processing device 105 (e.g., using processor 420 and/or memory 430) may execute the application based on at least the first set of instructions included in the container and the second set of instructions included in the container, as described above in connection with reference number 240 of FIG. 2B. As an example, the container processing device 105 may execute the application within a virtual machine to serve customer requests in a serverless computing environment, or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 2A-2D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
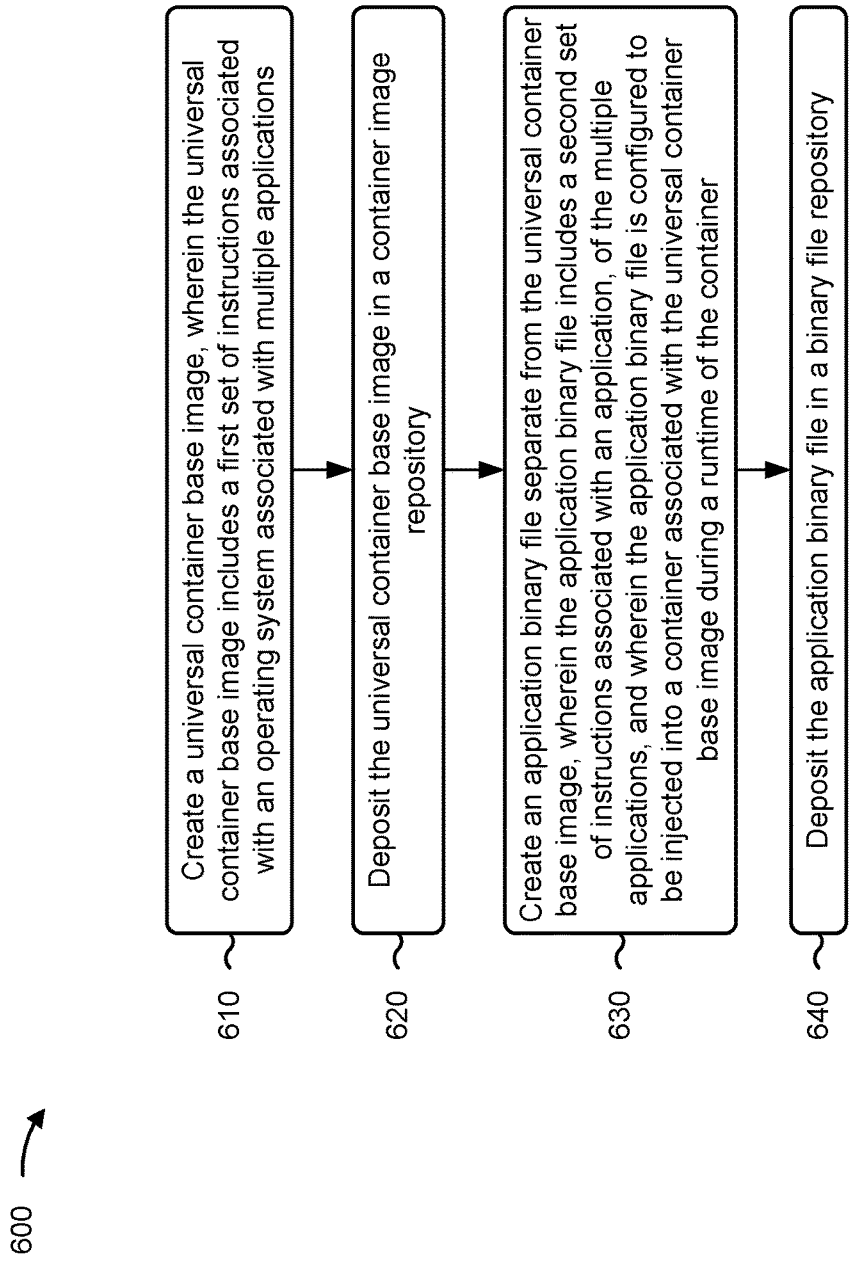
FIG. 6 is a flowchart of an example process associated with an updatable universal container base image, in accordance with some embodiments of the present disclosure.

FIG. 6 is a flowchart of an example process 600 associated with an updatable universal container base image. In some implementations, one or more process blocks of FIG. 6 may be performed by the image management device 115.

In some implementations, one or more process blocks of FIG. 6 may be performed by another device or a group of devices separate from or including the image management device 115, such as the container processing device 105, the image repository device 110, the binary file repository device 205, the image management device 330, the image repository device 340, the binary file repository device 350, and/or a virtual device associated with the cloud computing system 302. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include creating a universal container base image, wherein the universal container base image includes a first set of instructions associated with an operating system associated with multiple applications (block 610). For example, the image management device 115 (e.g., using processor 420 and/or memory 430) may create a universal container base image, wherein the universal container base image includes a first set of instructions associated with an operating system associated with multiple applications, as described above in connection with reference number 215 of FIG. 2A. As an example, an entity-level application development team may create a universal container base image to be used by multiple entity-wide applications, such as a universal container base image that includes an OS layer, an application language library layer, and/or similar base layers.

As further shown in FIG. 6, process 600 may include depositing universal container base image in a container image repository (block 620). For example, the image management device 115 (e.g., using processor 420 and/or memory 430) may deposit the universal container base image in a container image repository, as described above in connection with reference number 215 of FIG. 2A. As an example, the entity-level application development team may deposit the universal container base image in a container image repository associated with the entity, such as an in-house repository accessible by a cloud provider of a serverless container service, or the like.

As further shown in FIG. 6, process 600 may include creating an application binary file separate from the universal container base image, wherein the application binary file includes a second set of instructions associated with an application, of the multiple applications, and wherein the application binary file is configured to be injected into a container associated with the universal container base image during a runtime of the container (block 630). For example, the image management device 115 (e.g., using processor 420 and/or memory 430) may create an application binary file separate from the universal container base image, wherein the application binary file includes a second set of instructions associated with an application, of the multiple applications, and wherein the application binary file is configured to be injected into a container associated with the universal container base image during a runtime of the container, as described above in connection with reference number 220 of FIG. 2A. As an example, for each entity-wide application that is to run on top of the universal container base image, the entity-level application development team may create an application binary file that includes the application-specific code for the application.

As further shown in FIG. 6, process 600 may include depositing the application binary file in a binary file repository (block 640). For example, the image management device 115 (e.g., using processor 420 and/or memory 430) may deposit the application binary file in a binary file repository, as described above in connection with reference number 220 of FIG. 2A. As an example, the entity-level application development team may deposit the multiple application binary files in a binary file repository associated with the entity, such as an in-house repository accessible by a cloud provider of a serverless container service, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 2A-2D. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for updating a universal container base image in a container-based processing environment, the system comprising:

one or more memories; and one or more processors, coupled to the one or more memories, configured to:

receive a universal container base image, the universal container base image including a first set of instructions associated with an operating system associated with multiple applications;

receive an application-specific code separate from the universal container base image, the application-specific code including a second set of instructions associated with an application, of the multiple applications;

execute the application by injecting the second set of instructions into a container associated with the universal container base image during a runtime of the container, to cause the application to execute based on at least the first set of instructions included in the universal container base image and the second set of instructions included in the application-specific code;

receive an updated universal container base image, the updated universal container base image including a third set of instructions associated with an updated operating system associated with the multiple applications; and execute the application based on at least the second set of instructions included in the application-specific code and the third set of instructions included in the updated universal container base image, by injecting the second set of instructions into a container associated with the updated universal container base image during a runtime of the container.

2. The system of claim 1, wherein the universal container base image further includes a fourth set of instructions associated with an application language library associated with the multiple applications.

3. The system of claim 1, wherein the container-based processing environment is associated with a serverless computing environment.

4. The system of claim 1, wherein the application-specific code is associated with an application binary file.

5. The system of claim 1, wherein the one or more processors, to receive the universal container base image, are configured to receive the universal container base image from a container image repository, and wherein the one or more processors, to receive the application-specific code, are configured to receive the application-specific code from an application code repository separate from the container image repository from which the universal container base image is received.

6. The system of claim 1, wherein the universal container base image excludes hardcoded application binary information and includes a startup script having a dynamic variable to be replaced with the application-specific code during a runtime of a container associated with the universal container base image.

7. The system of claim 1, wherein the one or more processors are configured to execute the application using the application-specific code received from an application code repository separate from a container image repository from which the universal container base image is received.

8. A method for executing an application binary file, comprising:

receiving, by a container processing device, a universal container base image, the universal container base image including a first set of instructions associated with an operating system associated with multiple applications;

creating, by the container processing device, a container based on the first set of instructions included in the universal container base image;

receiving, by the container processing device, from an application code repository separate from a container image repository from which the universal container base image was received, an application-specific code separate from the universal container base image, the application-specific code including a second set of instructions associated with an application, of the multiple applications;

injecting, by the container processing device, the second set of instructions into the container during a runtime of the container; and executing, by the container processing device, the application based on at least the first set of instructions included in the container and the second set of instructions included in the container.

9. The method of claim 8, further comprising:

receiving, by the container processing device, an updated universal container base image, the updated universal container base image including a third set of instructions associated with an updated operating system associated with the multiple applications;

creating, by the container processing device, an updated container based on the third set of instructions included in the updated universal container base image;

injecting, by the container processing device, the second set of instructions into the updated container during a runtime of the updated container; and executing, by the container processing device, the application based on at least the second set of instructions included in the updated container and the third set of instructions included in the updated container.

10. The method of claim 8, wherein the universal container base image further includes a fourth set of instructions associated with an application language library associated with the multiple applications.

11. The method of claim 8, wherein the container processing device is associated with a serverless computing environment.

12. The method of claim 8, wherein the application-specific code is associated with an application binary file.

13. The method of claim 8, wherein receiving the universal container base image includes receiving the universal container base image from a container image repository, and wherein receiving the application-specific code includes receiving the application-specific code from an application code repository separate from the container image repository.

14. The method of claim 8, wherein the universal container base image excludes hardcoded application binary information and includes a startup script having a dynamic variable that is replaced with the application-specific code during a runtime of a container associated with the universal container base image.

15. A method for creating an updatable universal container base image, comprising:

creating, by a container image management device, a universal container base image, wherein the universal container base image includes a first set of instructions associated with an operating system associated with multiple applications;

creating, by the container image management device, an updated universal container base image, wherein the updated universal container base image includes a third set of instructions associated with an updated operating system associated with the multiple applications;

depositing, by the container image management device, the universal container base image and the updated universal container base image in a container image repository;

creating, by the container image management device, an application binary file separate from the universal container base image, wherein the application binary file includes a second set of instructions associated with an application, of the multiple applications, and wherein the application binary file is configured to be injected into a container associated with the universal container base image during a runtime of the container; and depositing, by the container image management device, the application binary file in a binary file repository.

16. The method of claim 15, wherein the universal container base image further includes a fourth set of instructions associated with an application language library associated with the multiple applications.

17. The method of claim 15, further comprising:

creating, by the container image management device, multiple application binary files separate from the universal container base image, wherein each of the multiple application binary files includes application-specific code relevant to a corresponding application, of the multiple applications, and wherein each of the multiple application binary files is configured to be injected into a corresponding container associated with the universal container base image during a runtime of the corresponding container; and depositing, by the container image management device, the multiple application binary files in the binary file repository.

18. The method of claim 15, wherein creating the universal container base image includes excluding hardcoded application binary information from the universal container base image and including a startup script having a dynamic variable to be replaced with the application binary file during a runtime of a container associated with the universal container base image.

19. The method of claim 15, wherein depositing the application binary file in the binary file repository includes depositing the application binary file in an application code repository separate from the container image repository.

20. The method of claim 15, wherein the updated universal container base image excludes hardcoded application binary information and includes a startup script having a dynamic variable to be replaced with the application binary file during a runtime of a container associated with the updated universal container base image.

* * * * *